US012634735B2

(12) United States Patent
Reddy et al.

(10) Patent No.: US 12,634,735 B2
(45) Date of Patent: May 19, 2026

(54) OPTIMAL PERFORMANCE MANAGEMENT REPORTING VIA HOST LEVEL NORTHBOUND PERFORMANCE REPORTING AGENT

(71) Applicant: Rakuten Symphony, Inc., Tokyo (JP)

(72) Inventors: Virendra Reddy, Bangalore (IN); Prasaanth Gowravalli, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 459 days.

(21) Appl. No.: 18/023,098

(22) PCT Filed: Jan. 24, 2023

(86) PCT No.: PCT/US2023/011382
§ 371 (c)(1),
(2) Date: Feb. 24, 2023

(87) PCT Pub. No.: WO2024/158379
PCT Pub. Date: Aug. 2, 2024

(65) Prior Publication Data
US 2025/0081012 A1 Mar. 6, 2025

(51) Int. Cl.
*H04W 24/10* (2009.01)
*G06F 11/34* (2006.01)

(52) U.S. Cl.
CPC ......... *H04W 24/10* (2013.01); *G06F 11/3409* (2013.01)

(58) Field of Classification Search
CPC ................ H04W 24/10; G06F 11/3409; G06F 11/3006; G06F 2201/86; G06F 11/3476;
(Continued)

(56) References Cited

U.S. PATENT DOCUMENTS

| | | | |
|---|---|---|---|
| 6,892,236 B1 * | 5/2005 | Conrad | ............... G06F 11/3409 |
| | | | 709/224 |
| 7,711,751 B2 * | 5/2010 | Kelley | .................. H04L 41/142 |
| | | | 709/224 |

(Continued)

FOREIGN PATENT DOCUMENTS

| | | | | |
|---|---|---|---|---|
| AU | 6515498 A | * | 1/1999 | ........... H04Q 3/0062 |
| CA | 2293468 A1 | * | 12/1998 | ........... H04Q 3/0062 |

(Continued)

OTHER PUBLICATIONS

International Search Report issued May 17, 2023 in Application No. PCT/US23/11382.

(Continued)

*Primary Examiner* — Michael A Keller
(74) *Attorney, Agent, or Firm* — Sughrue Mion, PLLC

(57) ABSTRACT

Provided are a method and system for handling northbound statistics reporting for the PM MS. The method, which may be performed by at least one processor for reporting data to a northbound management system (NBMS), the method including: receiving, by a statistics reporting microservice (SR MS) from an Performance Management microservice (PM MS) of a first Radio Access Network (RAN) Network Function (NF), first data comprising performance data; and reporting, from the SR MS to the NBMS, the first data.

17 Claims, 8 Drawing Sheets

(58) Field of Classification Search
CPC .......... G06F 2201/815; G06F 11/3452; H04L 41/046

See application file for complete search history.

(56) References Cited

U.S. PATENT DOCUMENTS

| | | | | |
|---|---|---|---|---|
| 8,392,556 B2 * | 3/2013 | Goulet | .................. | G06Q 10/06 709/224 |
| 8,700,765 B2 * | 4/2014 | Yumerefendi | ...... | G06F 11/3409 709/224 |
| 8,892,730 B2 * | 11/2014 | Du | .......................... | H04L 43/04 709/224 |
| 8,909,761 B2 * | 12/2014 | Reynolds | ........... | G06F 11/3419 718/1 |
| 9,565,079 B1 * | 2/2017 | Hawthorne | ............. | H04L 41/22 |
| 9,836,377 B1 * | 12/2017 | Danielson | ......... | G06Q 30/0201 |
| 10,863,376 B2 * | 12/2020 | Yao | ........................ | H04W 24/10 |
| 11,012,883 B2 * | 5/2021 | Yao | ........................ | H04W 24/04 |
| 11,051,195 B2 * | 6/2021 | Yao | ........................ | H04W 24/10 |
| 11,784,894 B2 * | 10/2023 | Andrianov | ......... | G06F 9/45533 709/224 |
| 11,792,096 B1 * | 10/2023 | Munn | ................ | H04L 43/0817 709/224 |
| 11,921,618 B2 * | 3/2024 | Li | ........................ | G06F 11/3636 |
| 12,066,921 B2 * | 8/2024 | Chunduri | ........... | G06F 11/3466 |
| 12,225,394 B2 * | 2/2025 | Kanekar | .............. | H04W 24/08 |
| 12,256,321 B2 * | 3/2025 | Krishan | .............. | H04L 43/0876 |
| 12,348,582 B2 * | 7/2025 | Reddy | .................. | H04L 67/566 |
| 12,402,070 B2 * | 8/2025 | Karampatsis | ......... | H04W 48/17 |
| 12,423,169 B2 * | 9/2025 | Reddy | .............. | G06F 11/0766 |
| 12,445,346 B2 * | 10/2025 | Reddy | .................... | H04L 43/06 |
| 12,452,150 B2 * | 10/2025 | Reddy | .................... | H04L 43/06 |
| 12,463,860 B2 * | 11/2025 | Reddy | .............. | H04L 41/0631 |
| 2010/0228851 A1 * | 9/2010 | Francis | .............. | H04L 41/5009 709/224 |
| 2011/0016207 A1 * | 1/2011 | Goulet | .................. | G06Q 10/06 709/224 |
| 2011/0055388 A1 * | 3/2011 | Yumerefendi | ........ | H04L 41/145 709/224 |
| 2012/0144027 A1 * | 6/2012 | Du | ........................ | H04L 41/022 709/224 |
| 2012/0203890 A1 * | 8/2012 | Reynolds | ........... | G06F 9/45558 709/224 |
| 2014/0016566 A1 * | 1/2014 | Wu | ........................ | H04W 24/10 370/328 |
| 2014/0207416 A1 * | 7/2014 | Bakalov | ................ | H04L 41/042 702/186 |
| 2016/0124833 A1 * | 5/2016 | Gupta | ................ | G06F 11/3409 714/45 |
| 2017/0295409 A1 * | 10/2017 | Simon | .................... | H04H 60/07 |
| 2020/0008088 A1 * | 1/2020 | Yao | ........................ | H04W 24/08 |
| 2020/0028761 A1 * | 1/2020 | Holness | ................ | H04L 47/125 |
| 2020/0092180 A1 * | 3/2020 | Bajaj | ..................... | H04L 67/535 |
| 2021/0288889 A1 * | 9/2021 | Andrianov | ............. | H04L 43/20 |
| 2022/0386159 A1 * | 12/2022 | Thomas | ................. | H04L 43/02 |
| 2023/0023383 A1 * | 1/2023 | Chou | ................... | H04W 24/10 |
| 2023/0195598 A1 * | 6/2023 | Li | ........................ | G06F 9/45558 714/38.1 |
| 2023/0205675 A1 * | 6/2023 | Chunduri | ................ | H04L 67/30 717/127 |
| 2023/0217360 A1 * | 7/2023 | Karampatsis | ........... | H04W 8/22 370/329 |
| 2023/0308906 A1 * | 9/2023 | Báder | .................. | H04W 24/02 |
| 2023/0370879 A1 * | 11/2023 | Chou | .................... | H04W 24/08 |
| 2023/0379809 A1 * | 11/2023 | Krishan | ............ | H04W 28/0284 |
| 2023/0403581 A1 * | 12/2023 | Kanekar | ............... | H04W 24/02 |
| 2024/0248830 A1 * | 7/2024 | Shpilyuck | ........... | G06F 11/3006 |
| 2024/0250864 A1 * | 7/2024 | Reddy | ................. | H04L 41/0631 |
| 2024/0259253 A1 * | 8/2024 | Reddy | .................. | H04L 41/044 |
| 2024/0259258 A1 * | 8/2024 | Reddy | ................. | H04L 43/0811 |
| 2024/0259282 A1 * | 8/2024 | Reddy | ..................... | H04L 41/40 |
| 2024/0422594 A1 * | 12/2024 | Subramanya | ......... | H04W 24/02 |
| 2025/0047565 A1 * | 2/2025 | Pateromichelakis | ...... H04L 43/0811 |
| 2025/0077328 A1 * | 3/2025 | Reddy | ................. | G06F 11/0766 |
| 2025/0080408 A1 * | 3/2025 | Reddy | ..................... | H04L 67/10 |
| 2025/0080409 A1 * | 3/2025 | Reddy | ................. | H04L 41/069 |
| 2025/0081012 A1 * | 3/2025 | Reddy | ................. | G06F 11/3452 |
| 2025/0097285 A1 * | 3/2025 | Reddy | ................. | H04L 67/1008 |
| 2025/0133428 A1 * | 4/2025 | Akl | ....................... | H04W 76/12 |
| 2025/0142494 A1 * | 5/2025 | Chopra | ................. | H04J 3/0667 |
| 2025/0168672 A1 * | 5/2025 | Kanekar | .............. | H04L 41/046 |

FOREIGN PATENT DOCUMENTS

| | | | | |
|---|---|---|---|---|
| CN | 106533723 B | * | 10/2020 | .......... H04L 67/131 |
| CN | 115699888 A | * | 2/2023 | ............. H04W 8/22 |
| CN | 119487811 A | * | 2/2025 | ........... H04W 24/02 |
| CN | 119856557 A | * | 4/2025 | ........... H04L 5/0092 |
| CN | 115699888 B | * | 7/2025 | ............. H04W 8/22 |
| EP | 2442491 A1 | * | 4/2012 | ......... H04L 41/022 |
| EP | 4050486 B1 | * | 10/2024 | ............ H04L 43/08 |
| EP | 4482105 A1 | * | 12/2024 | ........... H04L 43/08 |
| EP | 4150967 B1 | * | 8/2025 | ............. H04W 8/22 |
| EP | 4169283 B1 | * | 8/2025 | ......... H04W 88/06 |
| EP | 3500929 B1 | * | 11/2025 | ........ H04L 41/5041 |
| ES | 3038190 T3 | * | 10/2025 | ............. H04W 8/22 |
| JP | 2002505060 A | * | 2/2002 | ........... H04Q 3/0062 |
| JP | 2025521130 A | * | 7/2024 | ....... H04W 28/0284 |
| JP | 7763349 B2 | * | 10/2025 | ......... H04W 28/24 |
| JP | 7771418 B2 | * | 11/2025 | ....... H04W 28/0858 |
| KR | 20230011988 A | * | 1/2023 | ........... H04W 48/17 |
| WO | WO-2009072941 A1 | * | 6/2009 | ......... H04W 24/08 |
| WO | WO-2011017947 A1 | * | 2/2011 | ......... H04L 41/022 |
| WO | WO-2017019018 A1 | * | 2/2017 | ........ G06F 9/45558 |
| WO | WO-2017177042 A1 | * | 10/2017 | .......... G06F 9/5077 |
| WO | WO-2021228411 A1 | * | 11/2021 | ........... H04W 8/22 |
| WO | WO-2021258110 A1 | * | 12/2021 | ......... H04W 88/06 |
| WO | WO-2022069033 A1 | * | 4/2022 | ........... H04L 41/40 |
| WO | WO-2023142054 A1 | * | 8/2023 | ........ G06F 11/3006 |
| WO | WO-2023224683 A1 | * | 11/2023 | .......... H04L 41/046 |
| WO | WO-2024028041 A1 | * | 2/2024 | .......... H04W 24/02 |
| WO | WO-2024118052 A1 | * | 6/2024 | .......... H04W 24/04 |
| WO | WO-2024118053 A1 | * | 6/2024 | .......... H04W 24/02 |
| WO | WO-2024118058 A1 | * | 6/2024 | .......... H04W 24/04 |
| WO | WO-2024136875 A1 | * | 6/2024 | ......... H04L 41/052 |
| WO | WO-2024136876 A1 | * | 6/2024 | ......... H04L 41/342 |
| WO | WO-2024158378 A1 | * | 8/2024 | ........ G06F 11/0766 |
| WO | WO-2024158379 A1 | * | 8/2024 | ........ G06F 11/3409 |
| WO | WO-2024158380 A1 | * | 8/2024 | .......... H04L 41/069 |
| WO | WO-2025017579 A1 | * | 1/2025 | ........... G06N 20/00 |
| WO | WO-2025071456 A1 | * | 4/2025 | .......... H04W 24/10 |
| WO | WO-2025144513 A1 | * | 7/2025 | ........... H04W 4/50 |
| WO | WO-2025209782 A1 | * | 10/2025 | .......... H04W 24/04 |

OTHER PUBLICATIONS

Written Opinion issued May 17, 2023 in Application No. PCT/US23/11382.

* cited by examiner

Figure 2:
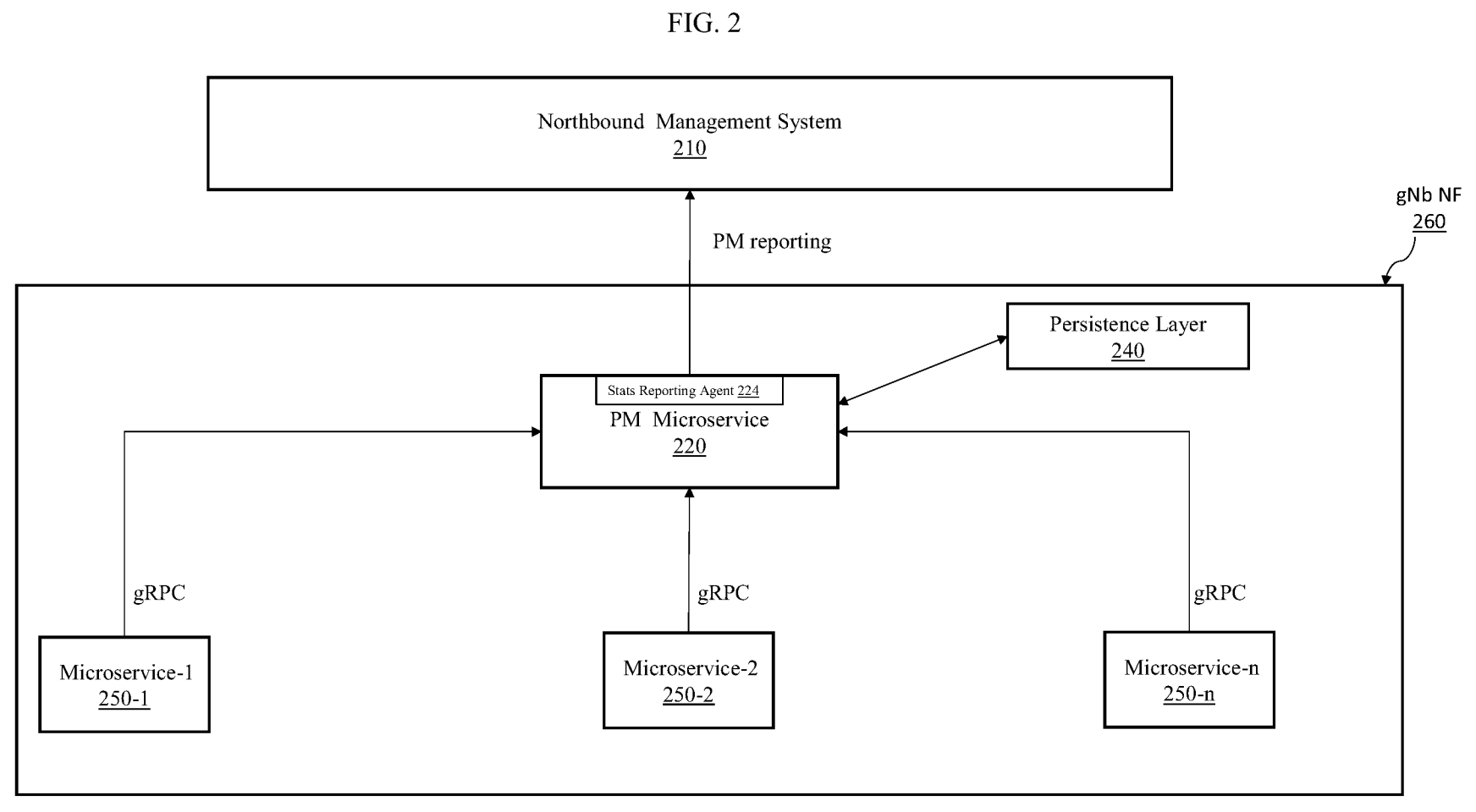

FIG. 2 gNb NF
260

Northbound Management System
210

PM reporting

Persistence Layer
240

PM Microservice
220

Stats Reporting Agent 224

Microservice-n
250-n gRPC

Microservice-2
250-2 gRPC

Microservice-1
250-1 gRPC

OPTIMAL PERFORMANCE MANAGEMENT REPORTING VIA HOST LEVEL NORTHBOUND PERFORMANCE REPORTING AGENT

CROSS REFERENCE TO RELATED APPLICATIONS

This application is a National Stage of International Application No. PCT/US2023/011382 filed Jan. 24, 2023.

BACKGROUND

1. Field

Systems and methods consistent with example embodiments of the present disclosure relate to handling of northbound performance reporting for statistics reporting microservices.

2. Description of Related Art

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Recently, the evolution of telco technologies enables many telco services to be realized virtually, in the form of software. For instance, RANs such as Open RAN (O-RAN) architectures, disaggregate one network component into multiple functional elements. By way of example, a baseband unit (BBU) or base station (i.e., eNB or gNB) is disaggregated into a number of functional elements including a distributed unit (DU) and a centralized unit (CU), wherein the CU can be further disaggregated into Centralized Unit-Control Plane (CU-CP) and Centralized Unit-User Plane (CU-UP). The disaggregation of network elements enables the telco services and the associated functions to be defined and provided in software-based form or virtual network services, such as Virtualized Network Functions (VNFs), Cloud-native Network Functions (CNFs) or Software Defined Networking (SDN), among others.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N in FIG. 1), and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN centralized Unit (O-CU), O-RAN Distributed Unit (O-DU), etc.).

The SMO framework manages and orchestrates RAN elements. Specifically, the SMO includes a Federated O-Cloud Orchestration and Management (FOCOM), a Network Function Orchestrator (NFO) that manages Virtual Machines (VM) based VNF and container (i.e., instance) based VNF, and the OAM as a part of the SMO that manages and orchestrates what is referred to as the O-Ran Cloud (O-Cloud).

Further, the SMO may include an operational support system (OSS) and an element management system (EMS), each of which is configurable to perform one or more of: fault management operation, configuration management operation, account management operation, performance management operation, and security management operation (FCAPS operations), on one or more services hosted or deployed in the servers. In some embodiments, the service management system may include a plurality of EMSs, each of the plurality of EMSs may be configured to manage a single service or a group of services associated with a particular vendor/service provider, and the OSS interfaces between the monitoring system, orchestrator, and the plurality of EMSs. Accordingly, the SMO may provide a single control point for managing a plurality of services (associated with multiple vendors/network service providers) via only one monitoring system and one orchestrator system (i.e., one monitoring system and one orchestrator system can be utilized to manage services associated with multiple vendors/service providers).

In the related art 5G architecture (O-RAN based), functionalities or subsystems in a Network Function (NF) may be implemented as microservices. For example, RU manager is a microservice which handles the DU<->RU related transactions. Baseband microservice implements the layer-1 and layer-2 of the 5G stack. FCAPS microservices is a set of microservices which handle aspects of the system like Fault Management (FM), Configuration Management (CM) and Performance Management (PM) of the gNodeB Network Function (gNB NF).

Fault Management microservice (FM MS) is responsible for collecting various events related to the functionality aspects (e.g., faults, error conditions, etc.) of the 5G O-RAN subsystems (such as those described above) within an NF. The FM MS may collect the corresponding fault events, e.g., cell down, FIC link down, timing locked, etc., from various microservices present in the gNB NF.

Performance Management microservice (PM MS) is responsible for collecting various statistics and counters related to performance aspects of the 5G O-RAN subsystems (such as those described above) within an NF. It then reports the performance statistics, e.g., throughput, active users, cell uptime, etc., after enriching the data summary to the north bound management system at predefined regular intervals.

Further, FM MS handles the Fault Management events that are related to functionality aspects, and PM MS handles the Performance Management statistics and counters related to performance aspects. FM MS and PM MS are quite similar microservices with respect to their interaction with the subsystems (collection and persistence aspect) and the northbound (reporting aspect). The FM MS or PM MS, based on predefined conditions, send notification reports to a Northbound Management System (NBMS). The NBMS, based on the notification reports, may create an alarm and consequently, initiates a triggering procedure for post processing or corrective measures that are associated with the alarm.

FIG. 2 is a block diagram of a communication flow of a PM MS 220 and a NBMS 210 in the related art. Referring to FIG. 2, the related approach is to have the PM MS 320 receive, store (in persistence layer 240), process, and transmit to the NBMS 210 (e.g., EMS and/or OSS) to the NBMS 210 the statistics data received from microservices 250-1, 250-2, . . . , 250-*n* (e.g., microservices implementing various subsystems as described above of the NF) based on predetermined criteria. The PM MS 220 includes a stats reporting agent 224 that is responsible for reporting the processed data FIG. 3 is a block diagram of components of a Fault Management (FM) microservice 310 and a Performance Management (PM) microservice 320 implemented in an NF. Referring to FIG. 3, the FM MS 310 may include: event collection agent 311 for receiving event data (e.g., fault-related event data) from subsystems (i.e., microservices) in the NF; persistence agent 312 for storing the received event data (in either or both of raw data form as received or enriched/encoded form as processed by the FM MS 310); event data enrichment & encoding agent 313 for enriching and encoding the received event data (raw data); and event reporting agent 314 for reporting the enriched and encoded event data to the NBMS. The PM MS 320 may include: stats collection agent 321 for receiving performance statistics data from subsystems (i.e., microservices) in the NF; persistence agent 322 for storing the received performance statistics data (in either or both of raw data form as received or aggregated/encoded form as processed by the PM MS 320); stats data aggregation & encoding agent 323 for aggregating and encoding the received statistics data (raw data); and stats reporting agent 324 for reporting the aggregated and encoded statistics data to the NBMS.

In the related art, as explained above, stats reporting agent 324 may be responsible for reporting the aggregated and encoded statistics data to the NBMS. However, if there are multiple NFs, then each NF will require its own statistics reporting logic, and thereby will require multiple IP addresses, which will lead to using duplicate stats reporting agents 324 per NF. This can be burdensome to the network resources, particularly by increasing the number of IP addresses that need to be managed, as well as the management/maintenance cost of the transport mechanism for the statistics reporting. Therefore, there is a need to introduce optimal performance management reporting so that there is no redundancy and to reduce the cost of reporting statistics from PM microservice 320 to the NBMS.

SUMMARY

Example embodiments of the present disclosure provide a method and system for handling northbound statistics reporting for the PM MS. Particularly, the stats reporting agent may be separated into a single statistics reporting microservice (SR MS) for the host, which can handle the statistics reporting for each NF to the NBMS.

Accordingly, example embodiments of the present disclosure can substantially reduce the network resources required for handling statistics reporting, and reduce the number of IP addresses used. This may also reduce the amount of configurations necessary on the NBMS side. Furthermore, example embodiments of the present disclosure can also reduce the amount of reliability testing required since the SR MS can be tested for the host independently of the NF (i.e., the NF does not need to be deployed for the reliability testing). Accordingly, the embodiments of the present disclosure may provide a more efficient and optimal approach of handling performance management reporting.

According to embodiments, a method performed by at least one processor, for reporting data to a northbound management system (NBMS) may be provided. The method may include: receiving, by a statistics reporting microservice (SR MS) from an Performance Management microservice (PM MS) of a first Radio Access Network (RAN) Network Function (NF), first data comprising performance data; and reporting, from the SR MS to the NBMS, the first data.

The method may further include: receiving, by the SR MS from another second PM MS of a second RAN NF, second data comprising performance data; and reporting, from the SR MS to the NBMS, the second data.

The performance data may include at least one performance statistic or counter.

The first data may be collected by the PM MS in the first RAN NF.

The method may further include: storing, by the SR MS, the received first data in a persistent storage for at least one of resiliency of SR MS and restart handling of SR MS.

The first data may be processed and/or encoded by the PM MS after being collected. The first data may be processed by enriching or aggregating by the PM MS after being collected.

According to embodiments, an apparatus for reporting data to a northbound management system (NBMS) may be provided. The apparatus may include at least one processor configured to execute computer-executable instructions to: receive, by a statistics reporting microservice (SR MS) from an Performance Management microservice (PM MS) of a first Radio Access Network (RAN) Network Function (NF), first data comprising performance data; and report, from the SR MS to the NBMS, the first data.

The at least one processor may be further configured to execute the computer-executable instructions to: receive, by the SR MS from another PM MS of a second RAN NF, second data comprising performance data; and report, from the SR MS to the NBMS, the second data.

The at least one processor may be further configured to execute the computer-executable instructions to: store, by the SR MS, the received first data in a persistent storage for at least one of resiliency of SR MS and restart handling of SR MS.

According to embodiments, a non-transitory computer-readable recording medium having recorded thereon instructions executable by at least one processor to cause the at least one processor to perform a method may be provided. The method may include: receiving, by a statistics reporting microservice (SR MS) from an Performance Management microservice (PM MS) of a first Radio Access Network (RAN) Network Function (NF), first data comprising performance data; and reporting, from the SR MS to the NBMS, the first data.

The method may further include: receiving, by the SR MS from another PM MS of a second RAN NF, second data comprising performance data; and reporting, from the SR MS to the NBMS, the second data.

The method may further include: storing, by the SR MS, the received first data in a persistent storage for at least one of resiliency of SR MS and restart handling of SR MS.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 2 is a block diagram of a communication flow of a Network Function (NF) and a NorthBound Management System (NBMS) in the related art;

DETAILED DESCRIPTION

Figure 1:
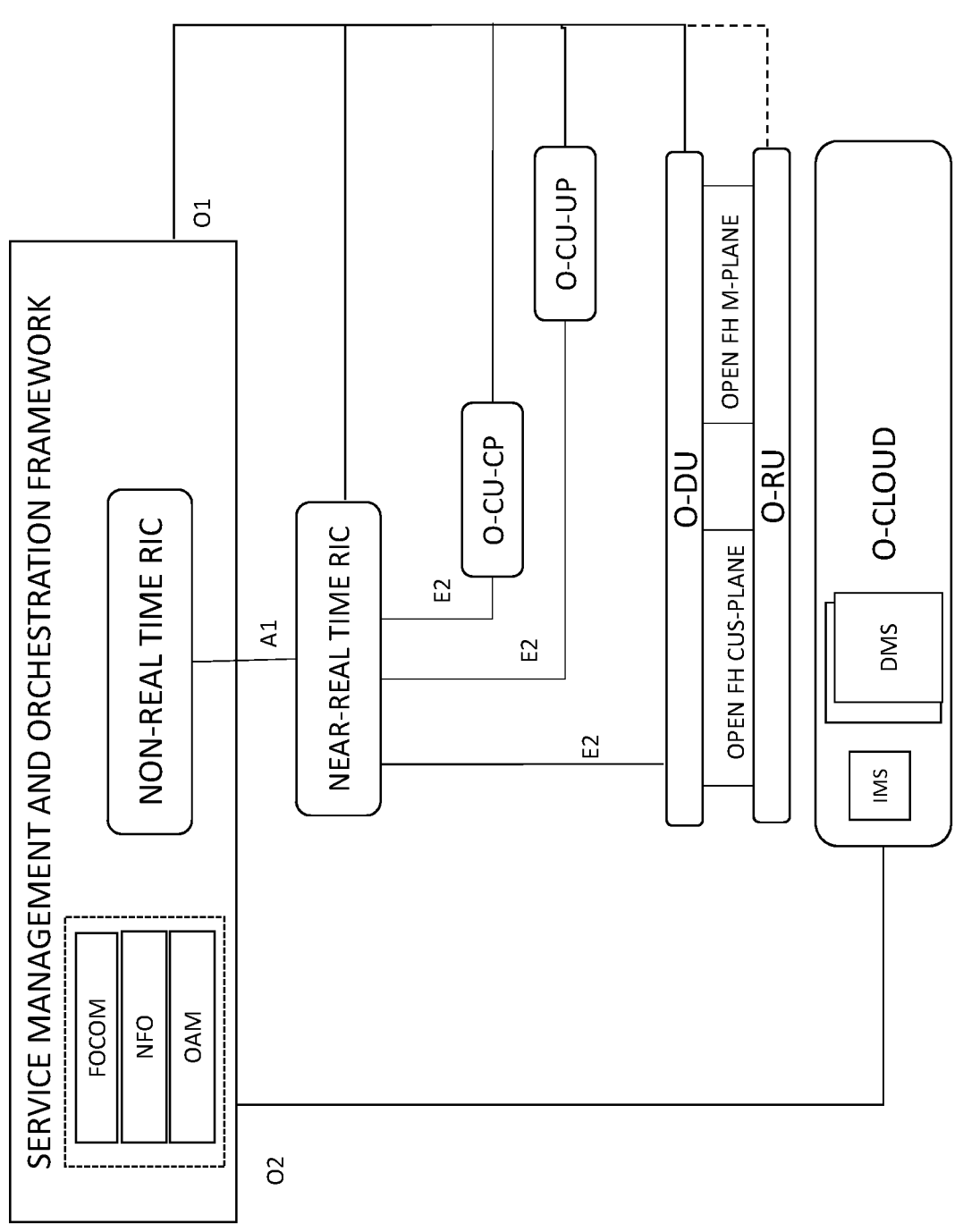
FIG. 1 illustrates an O-RAN architecture according to the related art.
Figure 3:
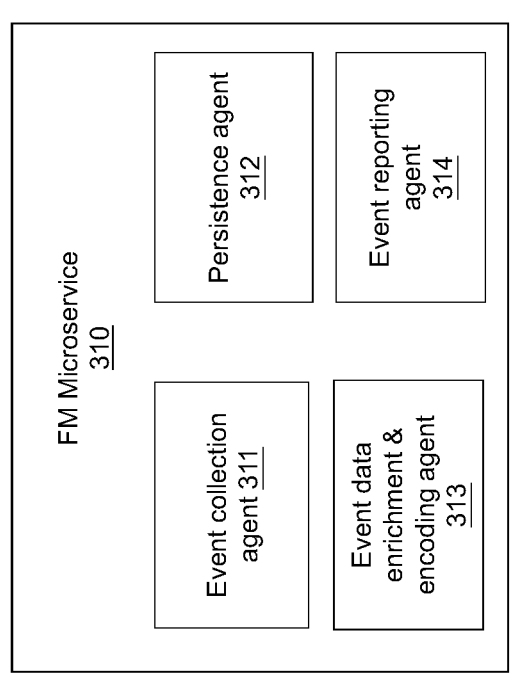
FIG. 3 is a block diagram of components of a Fault Management (FM) microservice and a Performance Management (PM) microservice implemented in an NF.

The following detailed description of example embodiments refers to the accompanying drawings.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Example embodiments of the present disclosure provide a method and system for handling northbound statistics reporting for the PM MS. Particularly, the stats reporting agent may be separated into a single statistics reporting microservice (SR MS) for the host, which can handle the statistics reporting for each NF to the NBMS. Accordingly, example embodiments of the present disclosure can substantially reduce the network resources required for handling statistics reporting, and reduce the number of IP addresses used. This may also reduce the amount of configurations necessary on the NBMS side. Furthermore, example embodiments of the present disclosure can also reduce the amount of reliability testing required since the SR MS can be tested for the host independently of the NF (i.e., the NF does not need to be deployed for the reliability testing).

Accordingly, the embodiments of the present disclosure may provide a more efficient and optimal approach of handling performance management reporting.

Figure 4:
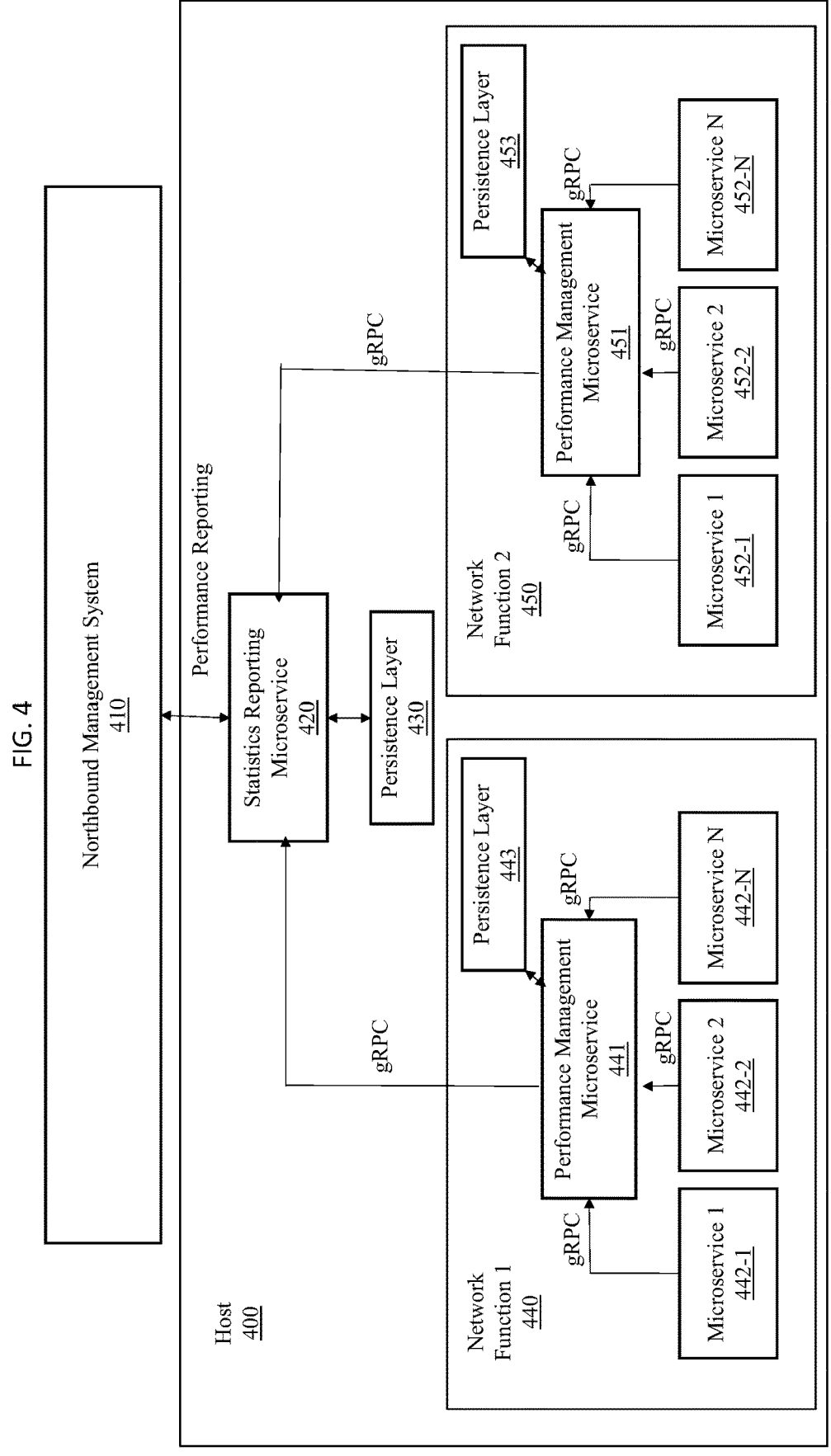
FIG. 4 is a block diagram of a communication flow of two Network Functions (NF) in a host, a statistics reporting microservice (SR MS) and a NorthBound Management System (NBMS) for optimal performance management reporting, according to an embodiment.

FIG. 4 is a block diagram of a communication flow of two Network Functions (NF) 440, 450 (e.g., CU, DU, etc.), a statistics reporting microservice (SR MS) 420, and a NorthBound Management System (NBMS) 410 for optimal performance management reporting, according to an example embodiment. NF 440, 450 and SR MS 450 may be implemented in the same Host 400. In some embodiments, Host 400 may be a virtual machine in cloud infrastructure, but may be any appropriate platform, for instance, as discussed in detail in the related descriptions for FIGS. 7 and 8 below. NF 440 may include performance management microservice (PM MS) 441, and NF 450 may include PM MS 451. PM MS 441 may collect performance data from connected microservices (microservices 442-1, 442-2, 442-n), and likewise with PM MS 451 and connected microservices (microservices 452-1, 452-2, 452-n). Examples of such performance data may include, but are not limited to, throughput, active users, and cell uptime. PM MS 441 and PM MS 451 may store the raw collected data in persistent layer (storage) 443 and 453 respectively. This, for example, allows the MS to subsequently retrieve the raw data for processing even if the MS needs to restart or reboot. PM MS 441 and PM MS

451 may perform processing/encoding on the raw collected data prior to being reported. In some embodiments, processing may include aggregating or enriching of the collected data by the PM MS. The performance data may be sent directly from PM MS 441 and PM MS 451 to SR MS 420 (e.g., over gRPC) so that it can be reported to NBMS 410. SR MS 420 may also be connected to a persistence layer (storage) 430 for storing performance data and/or other configuration data necessary for reporting to NBMS from each NF. For example, based on receiving the reported performance data, the SR MS 420 may store the received data in persistence layer 430. In this case, by way of example, the data may be retrieved by the SR MS 420 if needed (e.g., in case of a reset of the SR MS 420, in case the northbound reporting fails, etc.). The persistence layer (storage) may be used, for example, for the purpose of resiliency of SR MS 420 and restart handling of SR MS 420.

In some embodiments, the NBMS 410 may implement a Kafka cluster to collect PM performance data. Kafka is an open-source system that provides a unified, high-throughput, low-latency platform for handling real-time data feeds. Kafka can connect to external systems (for data import/export) via Kafka Connect, and provides the Kafka Streams libraries for stream processing applications. Kafka uses a binary TCP-based protocol that is optimized for efficiency and relies on a "message set" abstraction that naturally groups messages together to reduce the overhead of the network roundtrip. While Kafka may be used in some embodiments, other real time data streams may be used, and these streams may also be open-source. The use of real time data streams, and microservices create a new restructuring open-source platform. The data from SR MS 420 may have an Internet Protocol (IP) address (e.g., IPv4, IPv6, etc.) through which it may communicate to the NBMS 410.

According to the example embodiments as described above, NBMS 410 will accordingly only need to be configured (e.g., Kafka endpoints, etc.) for the SR MS 420 (i.e., at the infrastructure level), and does not need to be configured specifically for each of PM MS 441 and PM MS 451 of NF 440 and 450 respectively. Furthermore, since only SR MS 420 will need to communicate with NBMS 410, the number of IP addresses need to communicate will be substantially decreased. As a result, optimal performance management reporting can be achieved since the configurations required by the NBMS are decreased, and the network resources utilized may be reduced.

Further, according to the example embodiments as described above, since SR MS 420 is independent of NF 440 and NF 450, reliance testing may be performed independently of the NFs (e.g., the NFs do not need to be deployed), and on a per host basis. As a result, the amount of reliability testing upon host deployment may be reduced.

Figure 5:
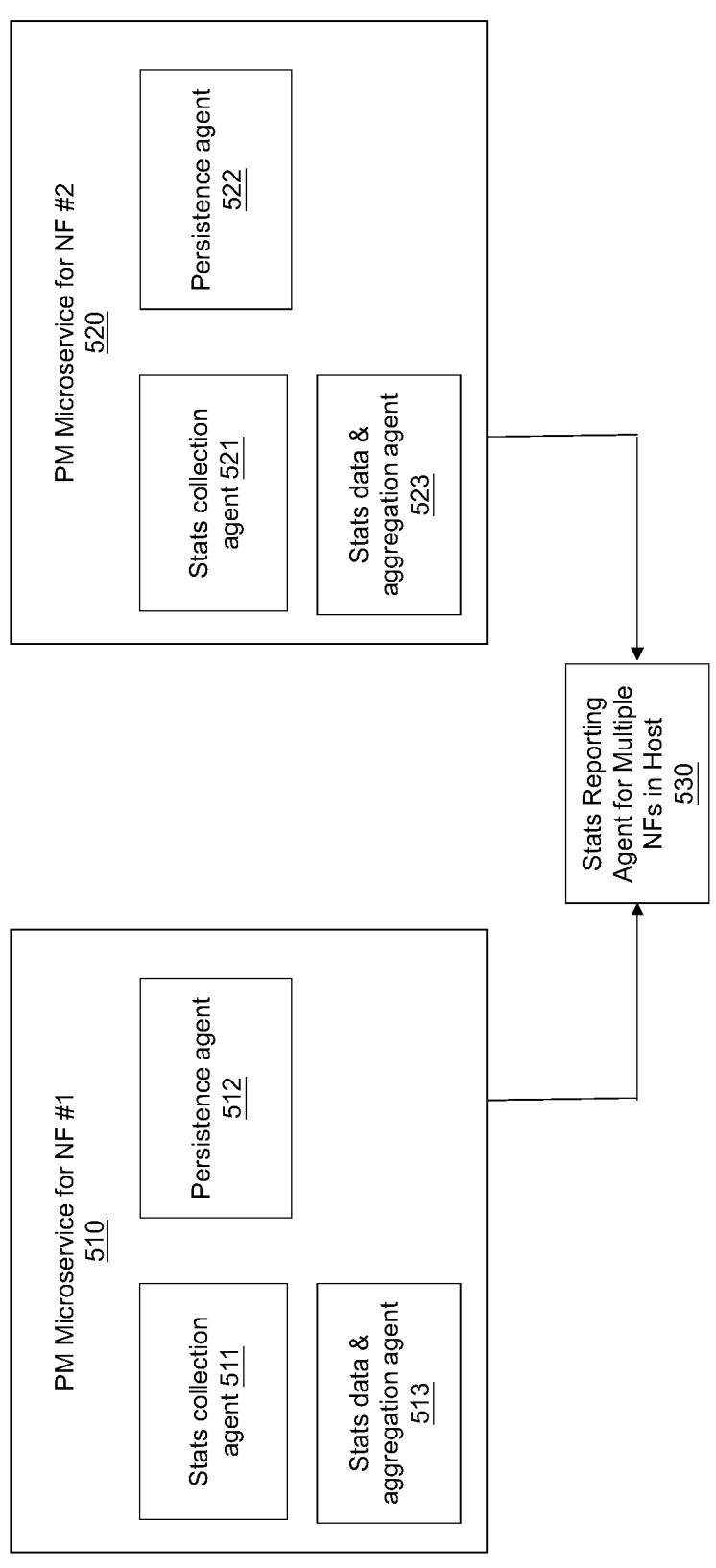
FIG. 5 is a block diagram of components of two PM microservices and a connected stats reporting agent, according to an example embodiment.

FIG. 5 is a block diagram of components of 2 PM microservices 510 and 520 (PM MS) and a connected stats reporting agent 530 (microservice), according to an example embodiment. Referring to FIG. 5, PM MS 510 may include: stats collection agent 511 for receiving performance statistics data from subsystems (i.e., microservices) in the NF; persistence agent 512 for storing the received performance statistics data (in either or both of raw data form as received or aggregated/encoded form as processed by the PM MS 520); and stats data aggregation & encoding agent 513 for aggregating and encoding the received statistics data (raw data). PM MS 520 may include a similar stats collection agent 521, persistence agent 522, and stats data aggregation & encoding agent 523. PM MS 510 and PM MS 520 may communicate with stats management reporting agent 530, which may report the fault event data to the NBMS 410 (this may be the enriched/encoded data).

Figure 6:
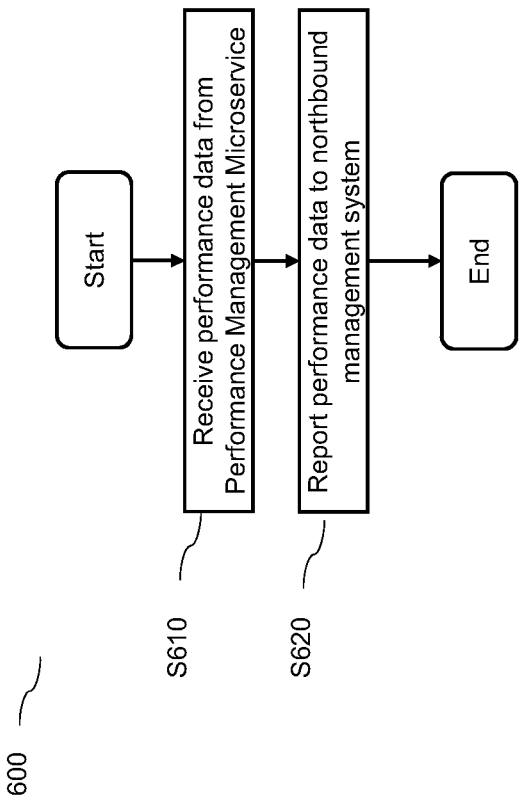
FIG. 6 is a flowchart of a method for optimal performance management reporting, according to an embodiment.

FIG. 6 is a flowchart of a method 600 for optimal performance management reporting, according to an embodiment. Operations S610 and S620 may be performed by the SR MS (i.e., SR MS 420 in FIG. 4 above)

At operation S610, SR MS receives performance/statistics data from PM MS (i.e., PM MS 441 or PM MS 451 in FIG. 4 above). As previously mentioned, this performance data may have been generated/processed from raw collected data (from connected microservices) by the PM MS, prior to being sent by the PM MS to the SR MS.

At operation S620, SR MS reports the performance data to the NBMS (i.e., NBMS 410 in FIG. 4 above). The configurations/protocols for sending the performance data may be configured by the NBMS, according to some embodiments.

Figure 7:
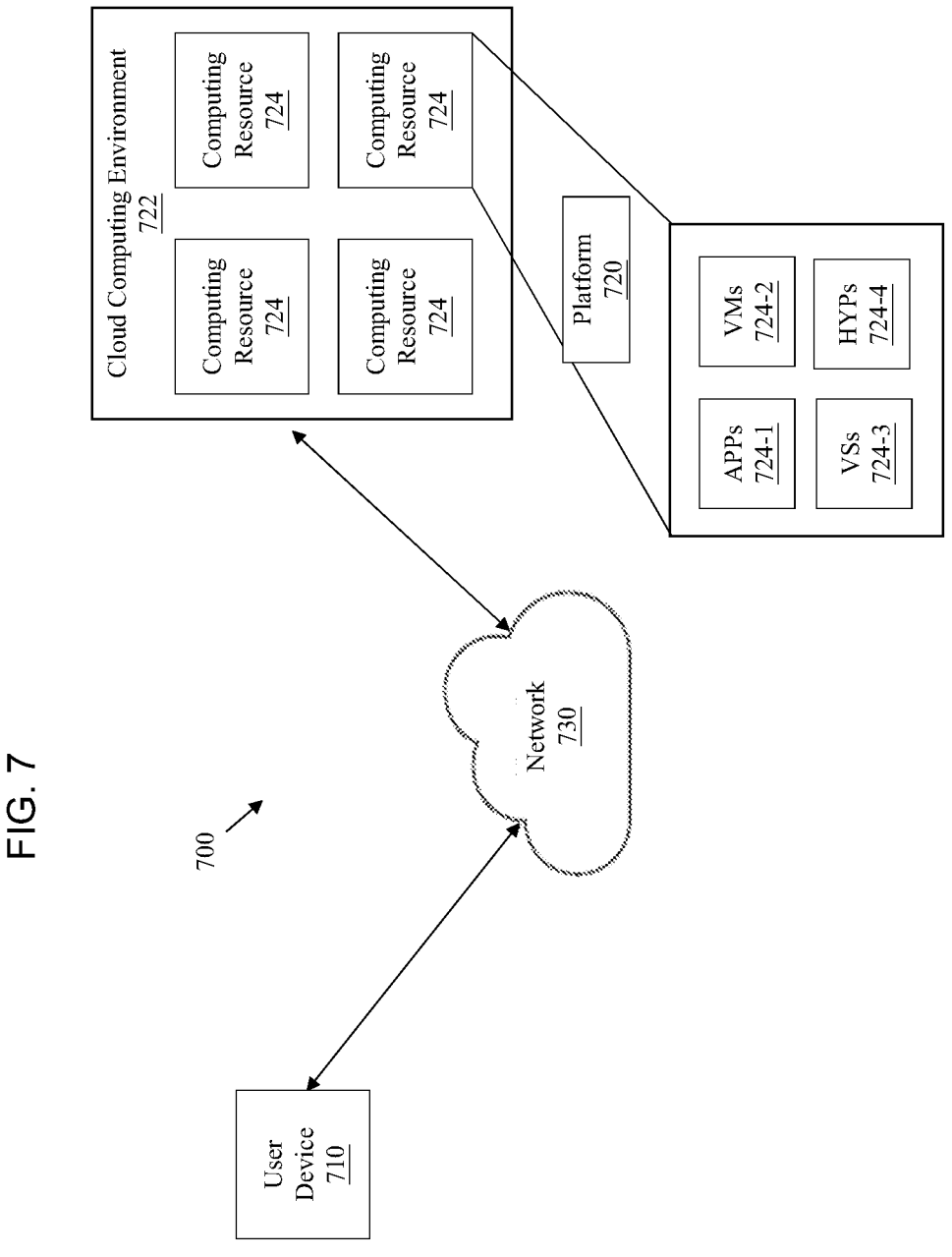
FIG. 7 is a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIGS. 4 through 6 above may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc., services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
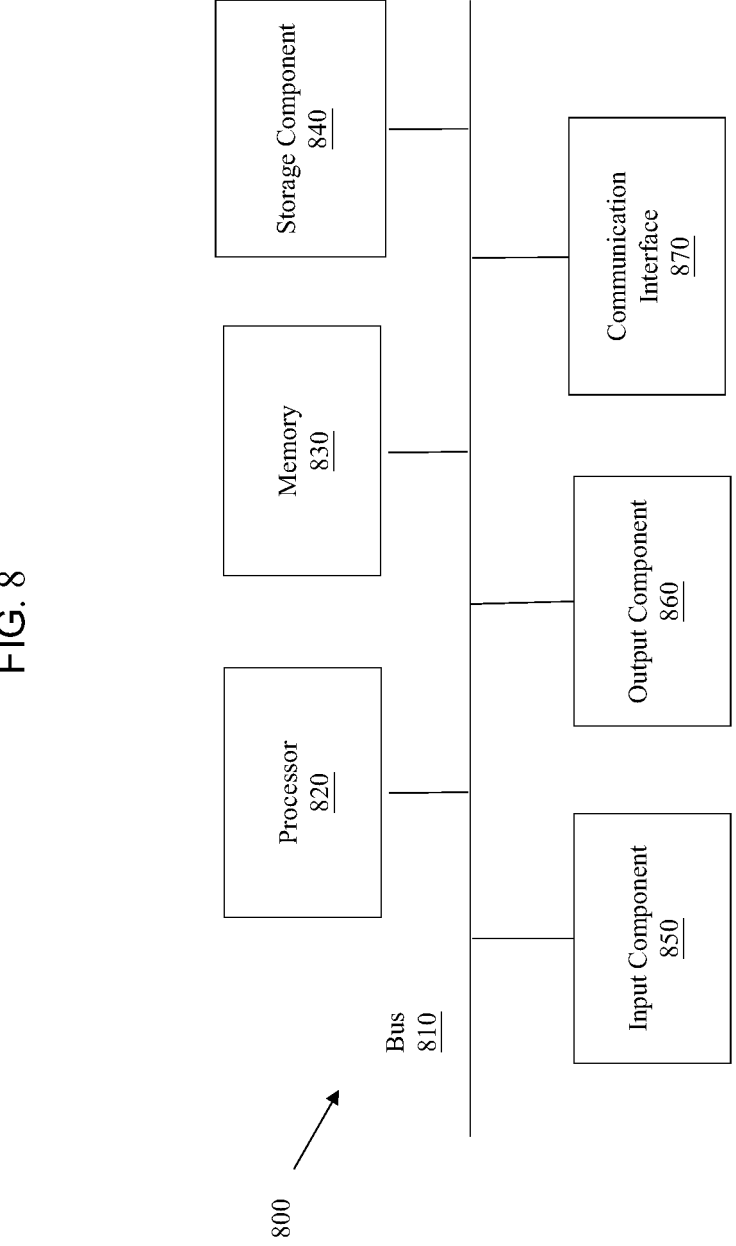
FIG. 8 is a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 4 through 6 may be implemented by or using any one of the elements illustrated in FIGS. 8 and 9. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various Aspects of Embodiments

Various further respective aspects and features of embodiments of the present disclosure may be defined by the following items:

Item [1]: A method, performed by at least one processor, for reporting data to a northbound management system (NBMS), the method comprising: receiving, by a statistics reporting microservice (SR MS) from an Performance Management microservice (PM MS) of a first Radio Access Network (RAN) Network Function (NF), first data comprising performance data; and reporting, from the SR MS to the NBMS, the first data.

Item [2]: The method according to item 1, further comprising: receiving, by the SR MS from another second PM MS of a second RAN NF, second data comprising performance data; and reporting, from the SR MS to the NBMS, the second data.

Item [3]: The method according to any one of items [1]-[2], wherein the performance data comprises at least one performance statistic or counter.

Item [4]: The method according to any one of items [1]-[3], wherein the first data is collected by the PM MS in the first RAN NF.

Item [5]: The method according to any one of items [1]-[4], further comprising: storing, by the SR MS, the received first data in a persistent storage for at least one of resiliency of SR MS and restart handling of SR MS.

Item [6]: The method according to item [4], wherein the first data is processed and/or encoded by the PM MS after being collected.

Item [7]: The method according to item [6], wherein the first data is processed by enriching or aggregating by the PM MS after being collected.

Item [8]: An apparatus for reporting data to a northbound management system (NBMS), the apparatus comprising at least one processor configured to execute computer-executable instructions to: receive, by a statistics reporting microservice (SR MS) from an Performance Management microservice (PM MS) of a first Radio Access Network (RAN) Network Function (NF), first data comprising performance data; and report, from the SR MS to the NBMS, the first data.

Item [9]: The apparatus according to item [8], wherein the at least one processor is further configured to execute the computer-executable instructions to: receive, by the SR MS from another PM MS of a second RAN NF, second data comprising performance data; and report, from the SR MS to the NBMS, the second data.

Item [10]: The apparatus according to any one of items [8]-[9], wherein the performance data comprises at least one performance statistic or counter.

Item [11]: The apparatus according to any one of items [8]-[10], wherein the first data is collected by the PM MS in the first RAN NF.

Item [12]: The apparatus according to any one of items [8]-[11], wherein the at least one processor is further configured to execute the computer-executable instructions to: store, by the SR MS, the received first data in a persistent storage for at least one of resiliency of SR MS and restart handling of SR MS.

Item [13]: The apparatus according to item [11], wherein the first data is processed and/or encoded by the PM MS after being collected.

Item [14]: The apparatus according to item [13], wherein the first data is processed by enriching or aggregating by the PM MS after being collected.

Item [15]: A non-transitory computer-readable recording medium having recorded thereon instructions executable by at least one processor to cause the at least one processor to perform a method comprising: receiving, by a statistics reporting microservice (SR MS) from an Performance Management microservice (PM MS) of a first Radio Access Network (RAN) Network Function (NF), first data comprising performance data; and reporting, from the SR MS to the NBMS, the first data.

Item [16]: The non-transitory computer readable recording medium according to item [15], the method further comprising: receiving, by the SR MS from another PM MS of a second RAN NF, second data comprising performance data; and reporting, from the SR MS to the NBMS, the second data.

Item [17]: The non-transitory computer readable recording medium according to any one of items [15]-[16], wherein the performance data comprises at least one performance statistic or counter.

Item [18]: The non-transitory computer readable recording medium according to any one of items [15]-[17], wherein the first data is collected by the PM MS in the first RAN NF.

Item [19]: The non-transitory computer readable recording medium according to any one of items [15]-[18], further comprising: storing, by the SR MS, the received first data in a persistent storage for at least one of resiliency of SR MS and restart handling of SR MS.

Item [20]: The non-transitory computer readable recording medium according to item [18], wherein the first data is processed and/or encoded by the PM MS after being collected.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method, performed by at least one processor, for reporting data to a northbound management system (NBMS), the method comprising:
receiving, by a statistics reporting microservice (SR MS) from a Performance Management microservice (PM MS) of a first Radio Access Network (RAN) Network Function (NF), first data comprising performance data; and
reporting, from the SR MS to the NBMS, the first data, wherein the method further comprises:
receiving, by the SR MS from another PM MS of a second RAN NF, second data comprising performance data; and
reporting, from the SR MS to the NBMS, the second data,
wherein the SR MS, the first RAN NF, and the second RAN NF are all located within the same host, and the SR MS is external to and distinct from the first RAN NF comprising the PM MS and the second RAN NF comprising the other PM MS.

2. The method as claimed in claim 1, wherein the performance data comprises at least one performance statistic or counter.

3. The method as claimed in claim 1, wherein the first data is collected by the PM MS in the first RAN NF.

4. The method as claimed in claim 1, further comprising:
storing, by the SR MS, the received first data in a persistent storage for at least one of resiliency of SR MS and restart handling of SR MS.

5. The method as claimed in claim 3, wherein the first data is processed and/or encoded by the PM MS after being collected.

6. The method as claimed in claim 5, wherein the first data is processed by enriching or aggregating by the PM MS after being collected.

7. An apparatus for reporting data to a northbound management system (NBMS), the apparatus comprising at least one processor configured to execute computer-executable instructions to:
receive, by a statistics reporting microservice (SR MS) from a Performance Management microservice (PM MS) of a first Radio Access Network (RAN) Network Function (NF), first data comprising performance data; and
report, from the SR MS to the NBMS, the first data, wherein the at least one processor is further configured to execute the computer-executable instructions to:
receive, by the SR MS from another PM MS of a second RAN NF, second data comprising performance data; and
report, from the SR MS to the NBMS, the second data, wherein the SR MS, the first RAN NF, and the second RAN NF are all located within the same host, and the SR MS is external to and distinct from the first RAN NF comprising the PM MS and the second RAN NF comprising the other PM MS.

8. The apparatus as claimed in claim 7, wherein the performance data comprises at least one performance statistic or counter.

9. The apparatus as claimed in claim 7, wherein the first data is collected by the PM MS in the first RAN NF.

10. The apparatus as claimed in claim 7, wherein the at least one processor is further configured to execute the computer-executable instructions to:
store, by the SR MS, the received first data in a persistent storage for at least one of resiliency of SR MS and restart handling of SR MS.

11. The apparatus as claimed in claim 9, wherein the first data is processed and/or encoded by the PM MS after being collected.

12. The apparatus as claimed in claim 11, wherein the first data is processed by enriching or aggregating by the PM MS after being collected.

13. A non-transitory computer-readable recording medium having recorded thereon instructions executable by at least one processor to cause the at least one processor to perform a method comprising:
receiving, by a statistics reporting microservice (SR MS) from a Performance Management microservice (PM MS) of a first Radio Access Network (RAN) Network Function (NF), first data comprising performance data; and
reporting, from the SR MS to the NBMS, the first data, wherein the method further comprises:
receiving, by the SR MS from another PM MS of a second RAN NF, second data comprising performance data; and
reporting, from the SR MS to the NBMS, the second data,
wherein the SR MS, the first RAN NF, and the second RAN NF are all located within the same host, and the SR MS is external to and distinct from the first RAN NF comprising the PM MS and the second RAN NF comprising the other PM MS.

14. The non-transitory computer readable recording medium as claimed in claim 13, wherein the performance data comprises at least one performance statistic or counter.

15. The non-transitory computer readable recording medium as claimed in claim 13, wherein the first data is collected by the PM MS in the first RAN NF.

16. The non-transitory computer readable recording medium as claimed in claim 13, further comprising:
storing, by the SR MS, the received first data in a persistent storage for at least one of resiliency of SR MS and restart handling of SR MS.

17. The non-transitory computer readable recording medium as claimed in claim 15, wherein the first data is processed and/or encoded by the PM MS after being collected.

\* \* \* \* \*